United States Patent [19]

Jacobson

[11] Patent Number: 5,082,202
[45] Date of Patent: Jan. 21, 1992

[54] DROPPABLE JET VANE TVC

[75] Inventor: Michael D. Jacobson, Ridgecrest, Calif.

[73] Assignee: The United States of America as represented by the Secretary of the Navy, Washington, D.C.

[21] Appl. No.: 537,640

[22] Filed: Jan. 6, 1975

[51] Int. Cl.⁵ .............................. F42B 10/66
[52] U.S. Cl. ........................ 244/322; 244/63
[58] Field of Search .......... 60/230; 239/265.15, 239/265.19; 244/3.22, 3.25

[56] References Cited

U.S. PATENT DOCUMENTS

| | | |
|---|---|---|
| 2,644,296 | 4/1953 | Sanz et al. ............... 60/230 |
| 3,139,033 | 6/1964 | Geissler et al. ............ 244/3.22 |
| 3,141,409 | 7/1964 | Travis et al. ............. 244/3.25 |
| 3,430,900 | 3/1969 | Turner et al. ............. 244/3.25 |
| 3,850,387 | 11/1974 | Bjornson et al. ............. 244/3.22 |
| 3,867,893 | 2/1975 | Saholt ................... 244/3.25 |

Primary Examiner—Michael J. Carone
Attorney, Agent, or Firm—Harvey A. Gilbert; Melvin J. Sliwka; John L. Forrest, Jr.

[57] ABSTRACT

A jet vane thrust vector control unit is provided to pitch a missile over into a generally horizontal path after the missile has been vertically launched. A collar affixed to the base of the missile by explosive bolts is utilized to mount the unit so that the unit can be jettisoned after it has done its job.

11 Claims, 3 Drawing Sheets

DROPPABLE JET VANE TVC

BACKGROUND OF THE INVENTION

1. Field of the Invention

This invention relates to a jet vane thrust vector control unit for use in steering a missile immediately after the missile has been launched. More specifically, this invention relates to a jet vane thrust vector control unit which will steer a missile as long as it is needed and is easily and quickly jettisoned when it is no longer needed.

2. Description of the Prior Art

It is, in certain cases, highly desirable to launch a missile vertically and, immediately after launch, to steer the missile into horizontal or nearly horizontal trajectory. Conventional airframe surfaces, such as fins, cannot provide the necessary control because of incapability at low initial speed. In such cases, stability may be maintained by an auto-pilot system through movable jet vanes. These jet vanes are affixed to the missile in the path of the exhaust gases and are designed to be manipulated to control the flow direction of the exhaust gases and, thus, the trajectory of the missile. Jet vanes can also be used to control the roll motion of the missile. These controls enable the missile to achieve stable flight in a vertical launch from a stationary platform. Since the jet vanes are movable they may then be manipulated to steer the missile into a desired horizontal flight path. Having accomplished these functions, if the vanes are no longer needed, they become so much excess baggage and more efficient use of fuel may be realized if the jet vane system be jettisoned after the missile has attained a satisfactory in-flight attitude. According to the present invention, a method and apparatus for vertical missile launch control is provided which enables a missile to be vertically launched from a relatively fixed or slow moving surface platform; be stabilized during initial acceleration; accomplish a maneuver at low Mach and then to pursue intercept a target with greater efficiency.

DESCRIPTION AND OPERATION

Figure 1:
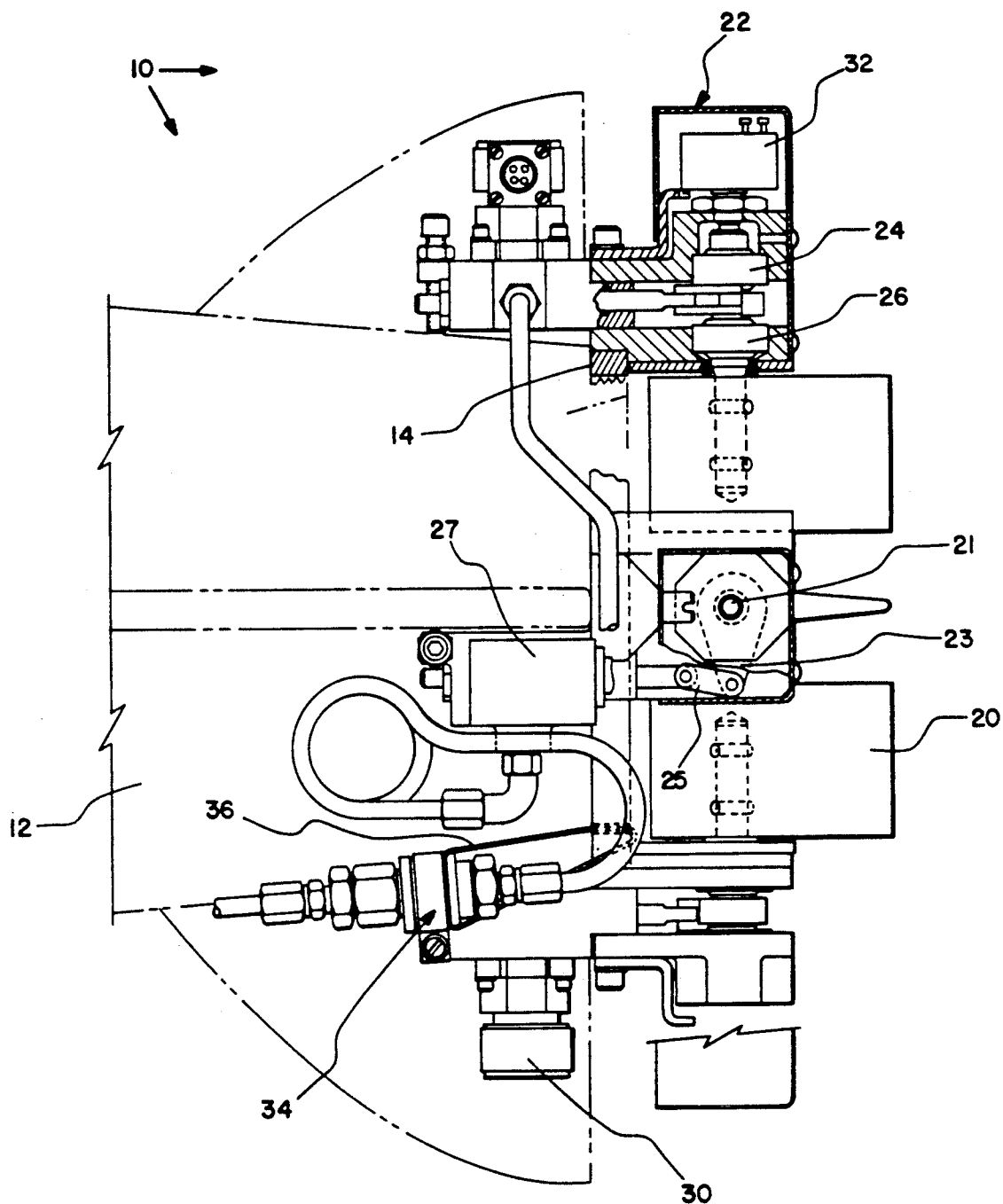
FIG. 1 is a side elevational view partially in section, with parts removed and the associated missile in phantom, of a preferred embodiment of the invention.
Figure 2:
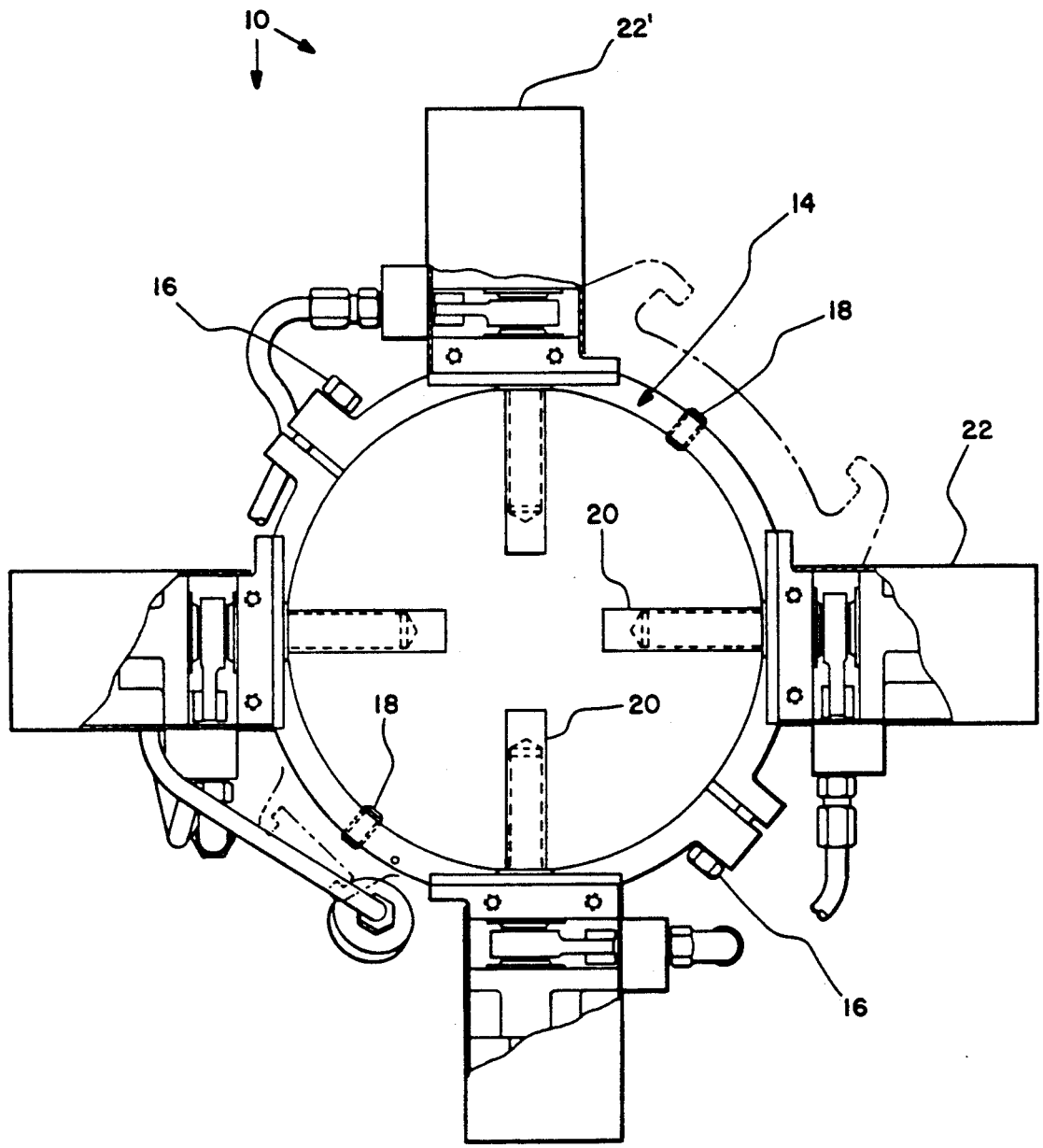
FIG. 2 is an end view of the device of FIG. 1 with parts broken away for clarity.

The aft end of a missile with a vane control device is generally indicated at numeral 10 in FIG. 1. The jet vane control device according to the present invention is attached to the missile 12 by means of an attachment ring 14 clamped to a threaded portion of the missile body 12. All of the elements of the vane control device are attached to ring 14 and the electrical and hydraulic connections are of the quick disconnect type so that the entire unit may be jettisoned when desired. For this purpose the attachment ring 14, better shown in FIG. 2, consists of two halves fastened together by remotely releasable fastening means such as explosive bolts 16 and secured against rotation on the rocket body by set screws 18.

The jet vane control device illustrated on the drawing consists of four (4) substantially identical vanes 20 each mounted on a servo-control housing 22 or 22', which housings are in turn mounted on attachment ring 14. The servo control means in each housing is connected to the missile guidance section for operation of the vane positioning mechanism. Considering the housing 22 to be oriented in a right hand configuration then the housing 22' is a mirror image thereof and may be termed to be in the left hand direction. The purpose of this arrangement is to assure that the two housings on the side of the missile near the missile launch lugs may be hooked to the electrical and hydraulic lines thereto without interfering with the launching of the missile.

The lugs 20 are pivotally mounted in bearings 24, 26 which are spaced apart within housing 22. Each of the shafts 21 has a crank member 23 integral therewith which serves to transmit a torque to shaft 21 from a toggle link 25 of the associated hydraulic mechanism 27. Each hydraulic mechanism 27 is connected, for example, to existing missile hydraulic power supply (not shown) and is provided with an electrically operated flow control device 30. Each vane actuator housing 22 encloses a feedback potentiometer 32 which provides vane position information to the missile guidance system.

All hydraulic and electrical connections are of the quick disconnect type and the hydraulic disconnect 34 may be operated by a pull on lanyard 36 when the vane control mechanism is jettisoned. The vane control mechanism is jettisoned by command from the missile guidance system through an individual circuit to the explosive bolts 16. When the explosive bolts 16 are blown, the two halves of the system separate and move away from the missile boattail. The lanyard 36 is attached to one section of the attachment ring and, as that section moves away from the missile the lanyard 36 is pulled sufficiently to cause separation of the hydraulic disconnect 34. The electrical system is unplugged in a similar manner and the missile is freed of the encumbrance of the jet vane control device after it has ceased to be of any use. The missile, therefore, being rid of excess weight and having the control mechanism out of the jet stream, will have an increased range capability from that point to the target.

Figure 3:
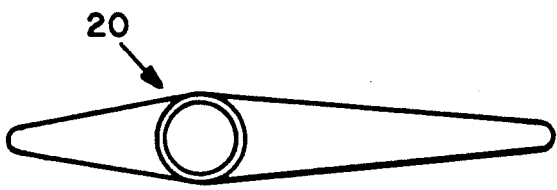
FIG. 3 is an end view of one of the vanes.

The control system according to the present invention can be realized in a number of ways. Thus, the number of vanes may vary as well as the shape and size of the vanes. The preferred embodiment of the invention as illustrated in the drawing, consists of four (4) substantially identical vanes of rectangular plan view as shown in FIG. 1 and having a rather simple cross sectional contour as shown in FIG. 3. This vane configuration, however, was not arrived at as a matter of chance. On the contrary, the four (4) vane designs illustrated and the particular shape of the vanes are the result of considerable development involving aerodynamic predictions as well as mathematical computations and static tests. The actual vanes used in the test were of the double-wedge design shown in FIG. 3 with rounded leading and trailing edges. The radius of both leading and trailing edges was 0.0625 inch. The vane span was 2 inches and the cord 3.2 inches with the maximum thickness being 0.51 inch. The maximum thickness is located on the hinge axis 1.1 inches from the leading edge (approximately 35 percent of the cord). The front wedge total angle is 20° and the vane planform is 6.4 inches square.

Figure 4:
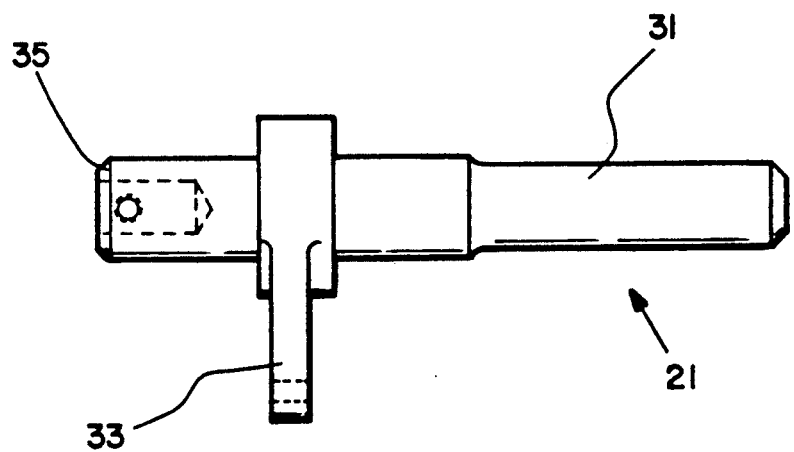
FIG. 4 is a plan view of a vane shaft.

Further consideration in vane design included the selection of copper-infiltrated tungsten as the vane material because of the extreme thermal environment. With this design consideration it was found that if an attempt were made to reduce vane drag by using very thin sharp leading edges, the vane would get hotter and erode more because (1) the sharp leading edge would tend to increase the heat transfer into the vane and (2) the thin section would tend to provide less of a heat sink. A thick vane with a blunt leading edge would add an additional amount of safety margin to the vane design. Furthermore, by incorporating the thick vane, a non-integral vane support could be used which greatly simplifed vane fabrication. Thus, the vane is supported on a shaft 21 of the configuration shown in FIG. 4.

The shaft 21 has an accurately machined portion 31 which fits with close tolerance into a bore in the vane 20 and which carries intermediate this machined portion and the other end, a crank member or arm 33. The end 35 opposite the vane end 31 is drilled and bored to provide attachment to a control shaft of a potentiometer 32, for example.

This simplified vane and shaft construction yields many obvious advantages over prior attempts to machine the shaft and vane from a single piece of tungsten or copper-infiltrated tungsten material.

What is claimed is:

1. The method of launching a reaction engine powered airborne vehicle into horizontal flight from a standing vertical position comprising:

attaching a plurality of individually controlled vanes having a hinge axis, in the path of the reaction engine nozzle flow;

utilizing said vanes to control pitch, roll and yaw of said vehicle during initial flight and to slew said vehicle from vertical to horizontal attitude; and effecting the release and jettison of said vanes from the path of said engine nozzle flow when said vehicle has achieved horizontal attitude.

2. In a jet-propelled aircraft, a jet motor adapted to produce a jet stream for aircraft propulsion, said motor having a boattail, a plurality of control vanes movably mounted on a detachable attachment ring fixed on the jet motor positioned in the jet stream and movable in either direction from a neutral position to produce a corresponding deflection of the motor jet stream for deflecting the direction of the jet stream relative to the flight direction of the aircraft, control means on the aircraft for sensing the departure of the aircraft from a predetermined flight attitude relative to said one axis of control, operating connecting means between said control means for actuating the control vanes in accordance with the magnitude and direction of the aircraft departure as determined by said control means to thereby displace the jet stream to exert a restoring force on the aircraft, a follow up means connected between said aircraft, and said control for restoring said control vanes to the neutral position when the jet motor has been deflected an amount sufficient to produce the requisite restoring force; and means for jettisoning said control vanes when said aircraft has assumed a desired flight speed and attitude.

3. Apparatus according to claim 2 wherein said vanes are mounted on a split attachment ring fastened to the boat tail of the jet motor by explosive bolts.

4. Apparatus according to claim 3 wherein said vanes are substantially rectangular in the cross sectional plane through the hinge axis and have a double wedge configuration in cross sectional plane perpendicular thereto; the leading and trailing edges thereof being blunt and rounded; the maximum thickness is located on the hinge axis; and said hinge axis is located approximately ⅓ the distance from the leading to the trailing edge.

5. Apparatus according to claim 4 wherein said vanes are fabricated substantially of tungsten.

6. Apparatus according to claim 5 wherein said vanes are four in number and are arranged in symmetrical array in the jet stream.

7. In a thrust control device for attachment in the jet stream of a reaction engine the combination comprising:

a split mounting ring contoured for attachment to a portion of said engine;

jet vane control means attached to said ring;

said control means including a plurality of individual vanes, having a hinge axis, mounted for pivotal movement on said ring; and said split mounting ring being attached to said engine by remotely releasable fastening means.

8. The device of claim 7 wherein said vanes are substantially rectangular in the cross sectional plane through the hinge axis and have a double wedge configuration in cross sectional plane perpendicular thereto; the leading and trailing edges thereof being blunt and rounded; the maximum thickness is located on the hinge axis; and said hinge axis is located approximately ⅓ the distance from the leading to the trailing edge.

9. The device of claim 8 wherein said vanes are fabricated substantially of tungsten.

10. The device of claim 9 wherein said vanes are four in number and are arranged in symmetrical array in the jet stream.

11. The device of claim 8 wherein said vanes are fabricated of a copper-infiltrated tungsten material.

* * * * *